(12) United States Patent
Siev et al.

(10) Patent No.: US 11,762,997 B2
(45) Date of Patent: *Sep. 19, 2023

(54) SECURITY MANAGEMENT OF ADVERTISEMENTS AT ONLINE ADVERTISING NETWORKS AND ONLINE ADVERTISING EXCHANGES

(71) Applicant: FIVE MEDIA MARKETING LIMITED, Nicosia (CY)

(72) Inventors: Amnon Sem Siev, Hod Hasharon (IL); Guy Books, Tel Aviv (IL); Sharon Abu, Petach Tikva (IL)

(73) Assignee: FIVE MEDIA MARKETING LIMITED, Nicosia (CY)

(*) Notice: Subject to any disclaimer, the term of this patent is extended or adjusted under 35 U.S.C. 154(b) by 0 days.

This patent is subject to a terminal disclaimer.

(21) Appl. No.: 16/895,393

(22) Filed: Jun. 8, 2020

(65) Prior Publication Data

US 2021/0012006 A1    Jan. 14, 2021

Related U.S. Application Data

(63) Continuation of application No. 16/507,925, filed on Jul. 10, 2019, now Pat. No. 10,678,923.

(51) Int. Cl.
*G06F 21/56* (2013.01)
*G06Q 30/0241* (2023.01)
*H04L 9/40* (2022.01)

(52) U.S. Cl.
CPC .......... *G06F 21/566* (2013.01); *G06F 21/563* (2013.01); *G06Q 30/0277* (2013.01); *H04L 63/1483* (2013.01); *G06F 2221/2119* (2013.01)

(58) Field of Classification Search
CPC .............. G06F 21/566; G06F 21/563; G06F 2221/2119; H04L 63/1483; H04L 63/1466; G06Q 30/0277
See application file for complete search history.

(56) References Cited

U.S. PATENT DOCUMENTS 7,000,183 B1   2/2006 Crawford, Jr.
7,287,089 B1   10/2007 Lamoureux et al.
(Continued)

FOREIGN PATENT DOCUMENTS

CN   103093148 A   5/2013
CN   103559446     2/2014
(Continued)

OTHER PUBLICATIONS

Wikipedia contributors. (May 2, 2019). Server (computing). In Wikipedia, The Free Encyclopedia. Retrieved 16:56, Aug. 23, 2022, from https://en.wikipedia.org/w/index.php?title=Server_(computing)&oldid=895110094 (Year: 2019).*

(Continued)

*Primary Examiner* — Robert B Leung
(74) *Attorney, Agent, or Firm* — The Roy Gross Law Firm, LLC; Roy Gross (57) ABSTRACT

At an advertising server: adding tracking code to advertisements served by the advertising server, wherein the tracking code is configured to cause web browsers displaying the served advertisements to transmit their contents to a security server. At the security server: scanning the received advertisements to detect presence of malicious code, and storing results of the scanning in a database. At the advertising server: prior to serving a new advertisement that has won in RTB, querying the database for scan results associated with the new advertisement. When the scan results indicate a malicious advertisement, preventing a serving of the new advertisement. When the scan results indicate a safe advertisement, allowing a serving the new advertisement. When no scan results are available for the new advertisement, adding the tracking code to the new advertisement and serving it, such that its contents are scanned by the security server.

20 Claims, 2 Drawing Sheets

(56) References Cited

U.S. PATENT DOCUMENTS

| | | | |
|---|---|---|---|
| 7,451,321 | B2 | 11/2008 | Dryer |
| 7,917,755 | B1 | 3/2011 | Giliyaru et al. |
| 8,413,236 | B1* | 4/2013 | Hansen ............... H04L 63/1441 726/22 |
| 8,516,590 | B1 | 8/2013 | Ranadive et al. |
| 8,555,391 | B1 | 10/2013 | Demir et al. |
| 9,027,140 | B1 | 5/2015 | Watkins et al. |
| 9,509,714 | B2 | 11/2016 | Sivan et al. |
| 9,876,896 | B1 | 1/2018 | Gailloux |
| 10,205,749 | B1 | 2/2019 | Sem Siev et al. |
| 10,320,816 | B1 | 6/2019 | Smith |
| 2005/0076215 | A1 | 4/2005 | Dryer |
| 2010/0306344 | A1 | 12/2010 | Athas et al. |
| 2011/0023031 | A1* | 1/2011 | Bonola ...................... G06F 8/61 718/1 |
| 2011/0191853 | A1 | 8/2011 | Atcha |
| 2011/0218866 | A1 | 9/2011 | Wilson |
| 2011/0219448 | A1 | 9/2011 | Sreedharan et al. |
| 2011/0307955 | A1 | 12/2011 | Kaplan |
| 2012/0173315 | A1 | 7/2012 | Martini |
| 2012/0174224 | A1 | 7/2012 | Thomas |
| 2012/0296713 | A1 | 11/2012 | Abdulhayoglu |
| 2013/0080867 | A1 | 3/2013 | Vandervort et al. |
| 2013/0160120 | A1 | 6/2013 | Malaviya |
| 2014/0067538 | A1 | 3/2014 | Hook et al. |
| 2014/0095324 | A1* | 4/2014 | Cabral ................... G06Q 30/08 705/14.71 |
| 2014/0344928 | A1* | 11/2014 | Sreedharan ......... H04L 63/1433 726/22 |
| 2015/0180997 | A1* | 6/2015 | Ramanan ............ H04L 67/2842 709/214 |
| 2015/0281258 | A1 | 10/2015 | Watkins |
| 2015/0371040 | A1 | 12/2015 | Ding et al. |
| 2014/0040394 | A1 | 2/2016 | Tang et al. |
| 2016/0063572 | A1 | 3/2016 | Brown et al. |
| 2016/0261623 | A1 | 9/2016 | Mcclintock et al. |
| 2017/0004543 | A1* | 1/2017 | Bhamidipati ...... G06Q 30/0242 |
| 2017/0243238 | A1 | 8/2017 | Kosai et al. |
| 2017/0243243 | A1 | 8/2017 | Kosai et al. |
| 2018/0012256 | A1 | 1/2018 | Napchi |
| 2018/0027291 | A1 | 1/2018 | Chen |
| 2018/0241738 | A1 | 8/2018 | Seolas |
| 2018/0332076 | A1 | 11/2018 | Callahan et al. |
| 2019/0394221 | A1 | 12/2019 | Xiao |
| 2021/0218761 | A1 | 7/2021 | Cheng |

FOREIGN PATENT DOCUMENTS

| | | |
|---|---|---|
| CN | 104199934 | 12/2014 |
| CN | 104346569 | 2/2015 |
| CN | 104751051 A | 7/2015 |

OTHER PUBLICATIONS

Balduzzi, et al., "A Solution for the Automated Detection of Clickjacking Attacks", ASIACCS'10 Apr. 13-16, 2010.

Rydstedt, et al., "Busting Frame Busting: a Study of Clickjacking Vulnerabilities on Popular Sites", In in IEEE Oakland Web 2.0 Security and Privacy (W2SP), 9 pages, 2010.

Shamsi, et al., "Clicksafe: Providing Security Against Clickjacking Attacks", 2014 IEEE 15th International Symposium on High-Assurance Systems Engineering, p. 206-210, 2014.

How to protect yourself from rogue redirect ads right now in Chrome, <https://www.androidpolice.com/2017/11/08/heres-protect-rogue-redirect-ads-right-now-chrome/>, Accessed on Jul. 10, 2019, retrieved May 22, 2018.

Iframe-buster-killer, <https://github.com/quafzi/iframe-buster-killer/blob/master/iframe-buster-killer.js>, retrieved May 22, 2018.

Frame Buster Buster . . . buster code needed, <https://stackoverflow.com/questions/958997/frame-buster-buster-buster-code-needed>, retrieved May 22, 2018.

Stop redirect from iframe | Warrior Forum—The #1 Digital Marketing Forum & Marketplace, <https://www.warriorforum.com/website-design/429413-stop-redirect-iframe.html>, retrieved May 22, 2018.

What is safe Frame or Safe Frame Container ?, <http://adtagmacros.com/what-is-safe-frame-safe-frame-container/>, retrieved May 22, 2018.

How to prevent IFRAME from redirecting top-level window, <https://stackoverflow.com/questions/369498/how-to-prevent-iframe-from-redirecting-top-level-window>, retrieved Oct. 2, 2018.

Is there a way to prevent an iframe from redirecting parent window, but in such a way that "top level" redirects still work inside the iframe itself?, <https://stackoverflow.com/questions/25958241/is-there-a-way-to-prevent-an-iframe-from-redirecting-parent-window-but-in-such>, retrieved Oct. 2, 2018.

IAB Technology Lab, "OpenRTB Specification v3.0," (Nov. 2018), available online at <https://github.com/InteractiveAdvertisingBureau/openrtb/blob/master/OpenRTB%20v3.0%20FINAL.md>, retrieved Jul. 10, 2019.

Ikrum, et al., "A First Look at Mobile Ad-Blocking Apps", Sep. 12, 2017, IEEE 16th International Symposium on Network Computing and Applications (NCA), 11 pages.

Zhang, et al., "AFrame: Isolating Advertisements from Mobile Applications in Android", Dec. 2013, ACSAC 2013, 10 pages.

Bucicoiu, et al., "XIOS: Extended Application Sand-boxing on IOS", ACM (Year: 2015).

Backes, et al., "Reliable Third-Party Library Detection in Android and its Security Applications", ACM (Year: 2016).

Geoedge blocking malware offensive ads webpage (Year: 2018).

Segura, et al. "Operation Fingerprint: A look into several Angler Exploit kit malvertising campaigns",Geoedge blocking malware offensive ads webpage (Year: 2018).

Unknown author; "HTML standard of the WC3.pdf"; Retrived from the Internet on Jul. 20, 2018 (Year: 2018).

Unknown author; Hypertext Transfer Protocol -HTTP1_1.pdf; Retrived from the Internet on Jul. 20, 2018 (Year: 2018).

Unknown author; "ECMAScript2018 Language Specification.pdf"; Retrived from the Internet on Jul. 20, 2018 (Year: 2018).

Wang, et al., "Discovering Typical Structures of Documents: A Road Map Approach", Proceedings of the 21st annual international ACM SIGIR conference on Research and development in information retrieval; Melbourne, Australia—Aug. 24-28, 1998; ACM Digital Library (Year: 1998).

Saadi, et al., "Morph Digital Signature A New Signature Framework for e-Documents in Pervasive Environments", IEEE International Conference on Pervasive Services, Jul. 15-20, 2007; IEEE Xplore (Year: 2007).

Dwyer, et al., "Malvertising—A Rising Threat To The Online Ecosystem", Journal of Information Systems Applied Research, (2017).

Yuan, et al. "A Survey on Real Time Bidding Advertising" IEEE (2014).

Zhang, et al. "Knowing your Enemy: Understanding and Detecting Malicious Web Advertising", Proceedings of the 2012 ACM Conference on Computer and communications security, (2012).

Dwyer, et al. "Gone in 200 Milliseconds: The Challenge of Blocking Malvertising", (2016).

\* cited by examiner

SECURITY MANAGEMENT OF ADVERTISEMENTS AT ONLINE ADVERTISING NETWORKS AND ONLINE ADVERTISING EXCHANGES

CROSS-REFERENCE TO RELATED APPLICATIONS

This application is a continuation of U.S. patent application Ser. No. 16/507,925, filed Jul. 10, 2019, entitled "Security Management of Advertisements at Online Advertising Networks and Online Advertising Exchanges."

BACKGROUND

The invention relates to the field of Internet security.

Internet visitor traffic is an expensive commodity. Advertisers, Internet marketers, and other players all compete on gaining visitor attention, which can later be translated into monetary profits. These players profit from visitors clicking on advertisements, filling in "business lead" forms, downloading software, etc.

Some malicious players opt to illegitimately direct Internet users to their own content, by redirecting them, without their knowledge, to these players' own resources—web sites, software download links, and the like.

Such illegitimate attacks oftentimes utilize online advertisements as their attack vector. The advertisements may be included with sophisticated HTML (HyperText Markup Language) and/or JavaScript programming, that causes a visitor's web browser to redirect to the attacker's desired resource without any intentional action by the visitor. This is true both for regular desktop web browsers, as well as browsers embedded in software applications ("apps") on mobile devices, where they are used to fetch external contents such as advertisements displayed next to the regular content of the app. In software apps, attacks also often include installation of unwanted software or viruses, displaying of unwanted content, or extraction of personal information from the portable computing device, to name a few examples.

Online advertising networks and online advertising exchanges, because of the sheer amount of advertisements they constantly serve, are often exploited by malicious players for distribution of their malicious advertisements.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method which comprises: At an advertising server that employs RTB (Real-Time Bidding): adding tracking code to advertisements served by the advertising server, wherein the tracking code is configured to cause web browsers displaying the served advertisements to transmit contents of the advertisements to a security server. At the security server: receiving the contents of the advertisements from web browsers that displayed the served advertisements, scanning the contents of the advertisements to detect presence of malicious code, and storing results of the scanning in a database maintained at the advertising server, at the security server, or at a different server. At the advertising server: prior to serving a new advertisement that has won an RTB process, querying the database for scanning results associated with the new advertisement, to determine if the new advertisement: (a) has been scanned in the past, and includes malicious code, (b) has been scanned in the past, and is devoid of malicious code, or (c) has not been scanned in the past; when the new advertisement has been determined to include malicious code, preventing a serving of the new advertisement; when the new advertisement has been determined to be devoid of malicious code, allowing a serving the new advertisement; when the new advertisement has been determined to not having been scanned in the past, adding the tracking code to the new advertisement and serving the new advertisement with the added security code, such that contents of the new advertisement are scanned by the security server.

Another embodiment provides a system which comprises an advertising server that employs RTB (Real-Time Bidding); and a security server. Each of said advertising server and said security server comprises at least one hardware processor, and a non-transitory computer-readable storage medium having program code embodied therewith, the program code executable by said at least one hardware processor for, respectively: At said advertising server: adding tracking code to advertisements served by the advertising server, wherein the tracking code is configured to cause web browsers displaying the served advertisements to transmit contents of the advertisements to said security server. At said security server: receiving the contents of the advertisements from web browsers that displayed the served advertisements, scanning the contents of the advertisements to detect presence of malicious code, and storing results of the scanning in a database maintained at the advertising server, at the security server, or at a different server. At said advertising server: prior to serving a new advertisement that has won an RTB process, querying the database for scanning results associated with the new advertisement, to determine if the new advertisement: (a) has been scanned in the past, and includes malicious code, (b) has been scanned in the past, and is devoid of malicious code, or (c) has not been scanned in the past; when the new advertisement has been determined to include malicious code, preventing a serving of the new advertisement; when the new advertisement has been determined to be devoid of malicious code, allowing a serving the new advertisement; when the new advertisement has been determined to not having been scanned in the past, adding the tracking code to the new advertisement and serving the new advertisement with the added security code, such that contents of the new advertisement are scanned by the security server.

A further embodiment provides a computer program product comprising at least one non-transitory computer-readable storage medium having program code embodied therewith, the program code executable by at least one hardware processor for: At an advertising server: adding tracking code to advertisements served by the advertising server, wherein the tracking code is configured to cause web browsers displaying the served advertisements to transmit contents of the advertisements to a security server. At said security server: receiving the contents of the advertisements from web browsers that displayed the served advertisements, scanning the contents of the advertisements to detect presence of malicious code, and storing results of the scanning in a database maintained at the advertising server, at the security server, or at a different server. At said advertising server: prior to serving a new advertisement that has won an RTB process, querying the database for scanning results associated with the new advertisement, to determine if the new advertisement: (a) has been scanned in the past, and includes malicious code, (b) has been scanned in the past, and is devoid of malicious code, or (c) has not been scanned in the past; when the new advertisement has been determined to include malicious code, preventing a serving of the new advertisement; when the new advertisement has been determined to be devoid of malicious code, allowing a serving the new advertisement; when the new advertisement has been determined to not having been scanned in the past, adding the tracking code to the new advertisement and serving the new advertisement with the added security code, such that contents of the new advertisement are scanned by the security server.

In some embodiments, the tracking code comprises JavaScript program code.

In some embodiments, the scanning of scanning of the contents of the advertisements comprises: searching for software methods capable of invoking a user event without an action by a user of a web browser; and analyzing the user event to determine if the user event is configured to cause the web browser to perform an action outside a dedicated advertising space.

In some embodiments, the user event is determined to be configured to cause the web browser to perform the action outside the dedicated advertising space, if the user event is of the group consisting of: "document.createEvent"; "Event.initEvent"; and use of an "Event( )" constructor to create a new event.

In some embodiments, the user event is determined to be configured to cause the web browser to perform the action outside the dedicated advertising space, if: the user event comprises a registration of a new event listener.

In some embodiments, said new event listener is selected from the group consisting of: "EventTarget.addEventListener"; "attachEvent( )"; and "captureEvents( )".

In some embodiments, the dedicated advertising space is an HTML (HyperText Markup Language) sub-document nested inside an iframe of an HTML document; and the action outside the dedicated advertising space is navigation away from the HTML document.

In some embodiments, the dedicated advertising space is inside a software application which is not a web browser.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a method, a system, and a computer program product for security scanning of online advertisements ("ads") that are served by online advertising networks or online advertising exchanges. An advantageous configuration is used to implant tracking code inside ads, have their contents be sent for analysis, and then allow the online advertising network or online advertising exchange to obtain security information as to each ad in real-time, right before the ad is served to Internet users. This configuration is computationally-efficient especially in the case of online advertising networks or online advertising exchanges that employ Real-Time Bidding (RTB) to select ads for serving.

The security information obtained by the online advertising network or online advertising exchange may enable them to refrain from serving ads that include malicious or otherwise inappropriate content. As a result, end users to which ads are served remain protected from attacks such as links to download unwanted software (which may include, for example, computer viruses), redirects to other HTTP (HyperText Transfer Protocol) resources that display content in lieu of the advertisements, or extraction of these users' personal information and its unauthorized transmission to the attacker.

Another reason to block certain advertisements from being served is that they are not suitable for the user demographic of the particular Web site or mobile app. For example, if the mobile app is a game for children, it may be unsuitable to display in its advertisements for gambling. Yet another reason to block certain advertisements is that they cause trademark or brand dilution; brands may not want their advertisements to show in software applications of a character that might degrade the brand. For instance, a large corporation may prefer that its advertisements are not shown inside software applications or Web sites directed to anti-capitalism activists. In this case, the developer of the software application or the owner of the Web site may not be the one particularly interested in the blocking, but rather the advertiser might promote the use of the invention.

Glossary

Online Advertising Server ("Ad Server"): A Web server that stores advertisements (which are manifested by HTML and/or JavaScript code, often in conjunction with media such as images, videos, or sounds) and serves them for display by various digital platforms, such as Web sites and mobile software applications ("mobile apps"). Additional technology typically included with ad servers is the capability to log ad serving activity, track user clicks on ads, track impressions by users, etc. Many of today's ad servers operate according to an RTB scheme and allow advertisers to place bids for ad serving as well as set up budgets for advertising campaigns. These ad servers conduct the RTB and serve winning ads for display in Web sites and mobile software applications. When the term "ad server" is used herein, it does not necessarily mean a single computer. An ad server may be comprised of multiple computing devices that together fulfill ad server functionality.

Online Advertising Network ("Ad Network"): A business entity that connects advertisers to Web sites and mobile apps that want to display advertisements for profit. This term is synonymous with the technology that facilitates that activity, such as software that aggregates ad supply from publishers (i.e., operators of Web sites and mobile apps) and matching it with advertiser's demand. An ad network typically operates ad servers to fulfill those functionalities. The terms Online Advertising Platform ("Ad Platform") and ad network are often used interchangeably. Prominent ad networks include Google Ads by Google LLC, Microsoft Advertising by Microsoft Corp., and Baidu Tuiguang by Baidu, Inc., for example.

Online Advertising Exchange ("Ad Exchange"): A technology platform that facilitates the buying and selling of media advertising inventory (ads and ad space) from multiple ad networks and operates according to RTB. Ad exchanges typically operate ad servers for facilitating their functionality. Some major ad exchanges today are OpenX by OpenX Software Ltd., AppNexus by AppNexus, Inc., Smaato by Smaato, Inc., and Rubicon Project by The Rubicon Project, Inc.

The various other technical terms used herein are intended to have the meaning prescribed in RFC 2616, "Hypertext Transfer Protocol—HTTP/1.1", available at https://tools.ietf.org/html/rfc2616; in the Hypertext Markup Language (HTML) standard of The World Wide Web Consortium (W3C), available at https://www.w3.org/standards/techs/html; and in the Standard ECMA-262, "ECMAScript® 2018 Language Specification", available at https://www.ecma-international.org/publications/standards/Ecma-262.htm, (also known as the 'Javascript standard').

Figure 1:
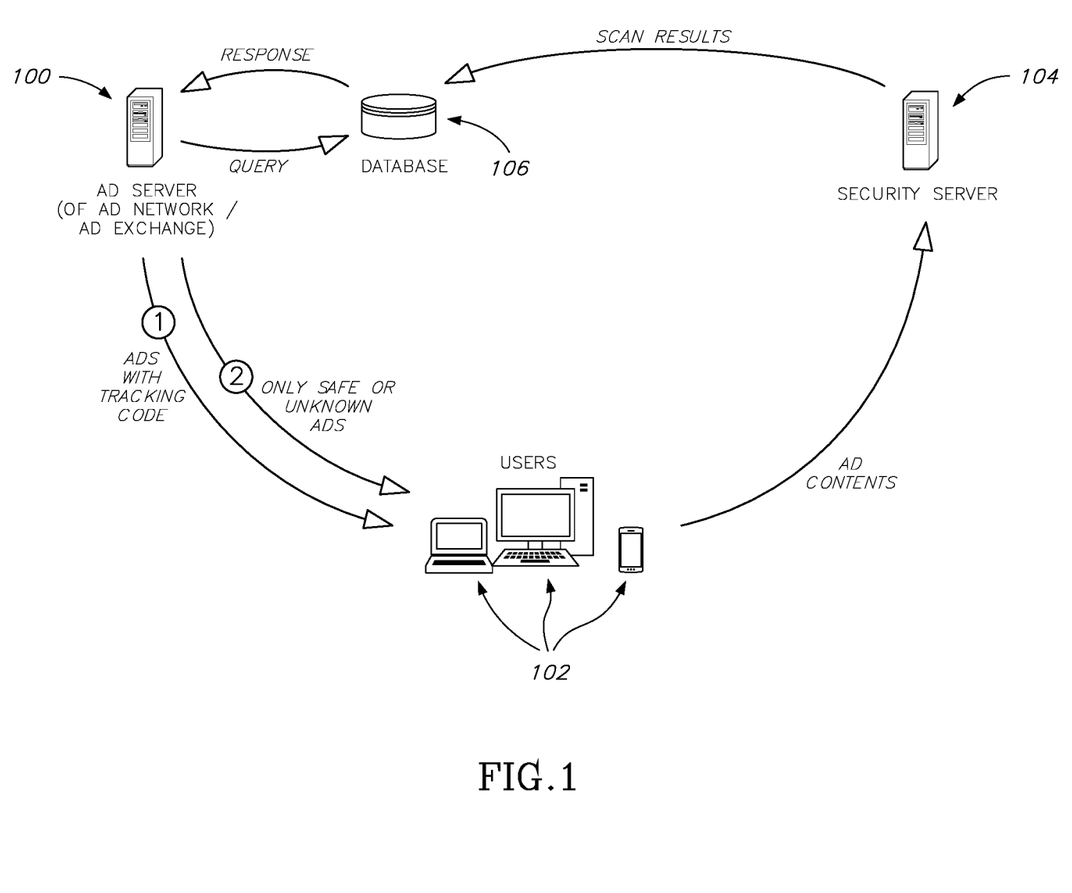
FIG. 1 is a block diagram illustrating an embodiment of the present invention.

Reference is now made to FIG. 1, which shows a diagram illustrating an embodiment of the present invention. This diagram provides a general overview of the embodiment, while the discussion of FIG. 2, further below, discusses the embodiment in greater detail.

An ad server 100, optionally of an ad network or an ad exchange that employ RTB, adds tracking code to all or some of the ads it serves to users 102 of various computing devices, such as portable computing devices (e.g., smartphones, tablets, smartwatches running operating systems such as Android™, iOS®, BlackBerry® OS, Windows® Mobile, or Tizen™) and desktop/laptop computing devices (running operating systems such as Windows®, macOS®, or Linux).

As the ads are being viewed by web browsers (or a WebViews in mobile apps) of users 102, the tracking code is executed by the web browser or WebView, and the contents of the ads are transmitted to a security server 104. For simplicity of discussion, both a web browser and a WebView will be referred to herein as a "web browser", because a WebView is essentially a Web browsing component used in mobile apps.

At security server 104, the contents of the ads are scanned, to detect the presence of malicious code therein. Results of this scanning are stored in a database 106, which is optionally hosted in the same local network as ad server 100, to enable fast communications between the two.

Then, every time an ad has won an RTB process at ad server 100, and before serving that ad to users 102, the ad server may query database 106 in order to determine if the ad (a) has been scanned in the past, and includes malicious code, (b) has been scanned in the past, and is devoid of malicious code, or (c) has not been scanned in the past. This querying will only cause a brief delay in the serving of the ad, especially when database 106 is hosted locally with ad server 100.

If the response from database 106 indicates that the ad has been scanned in the past and includes malicious code, ad server 100 may refrain from serving it. Instead, ad server 100 may query database 106 for information an ad which was the second-highest bidder in the RTB, and so on and so forth for subsequently-highest bids.

If the response from database 106 indicates that the ad (or the subsequently-highest bidder ad) has been scanned in the past and is devoid of malicious code, ad server 100 may proceed to serve that respective ad.

If the response from database 106 indicates that the ad has not been scanned in the past (namely, the database does not have information about this ad), then ad server 100 may add the tracking code to the ad and serve it. This way, the contents of the ad will be transmitted by one of users 102 to security server 104, be scanned, and the results be added to database 106 for future use.

Periodically, even for an ad that appears in database 106 as being devoid of malicious code, ad server 100 may add tracking code to the ad before serving it, because an attacker might perform a modification to an existing ad, rendering it suddenly malicious.

Figure 2:
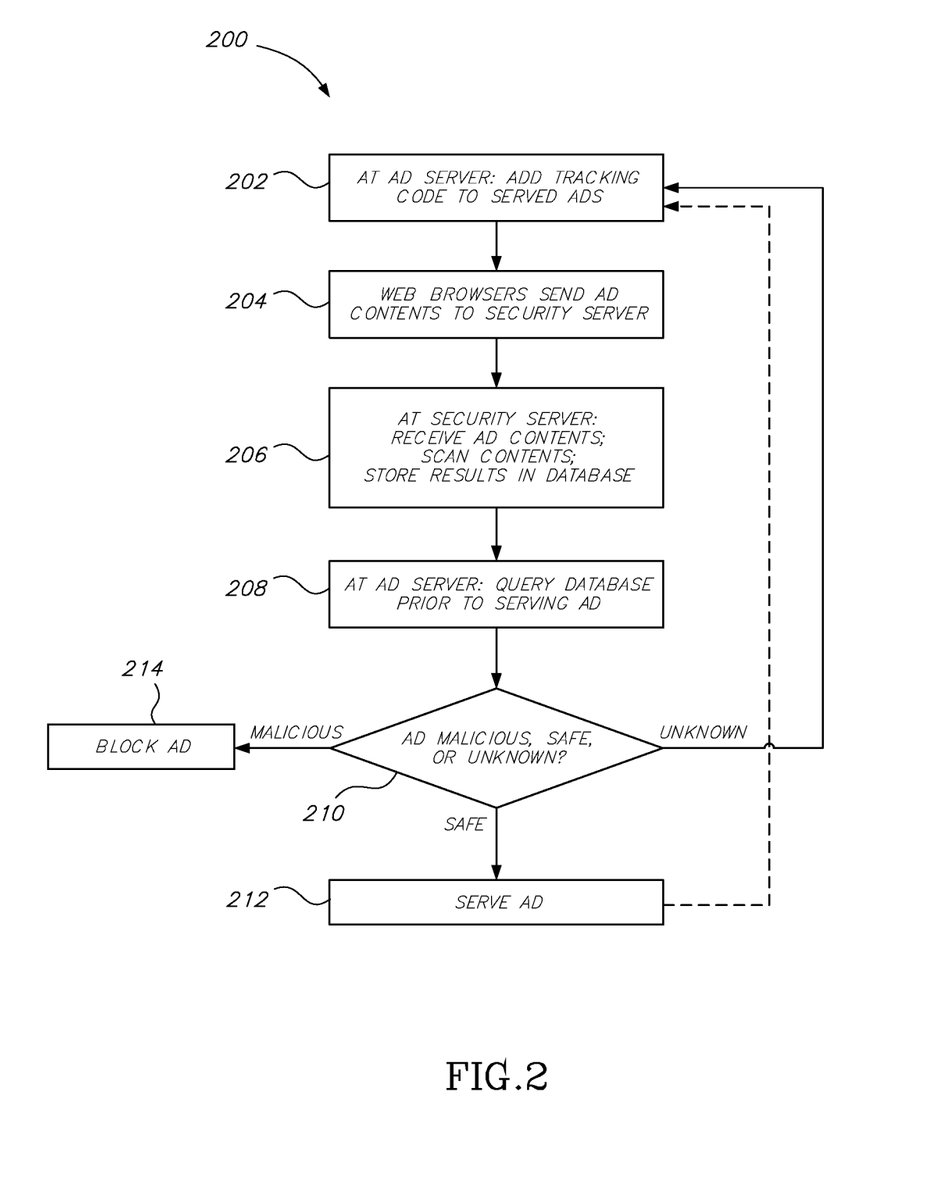
FIG. 2 is a flow chart of a method, according to an embodiment of the present invention.

Reference is now made to FIG. 2, which shows a flow chart of a method 200 for security management of ads at an ad network or an ad exchange.

In a step 202, an ad server (which is optionally of an ad network or an ad exchange that employ RTB), adds tracking code to all or some of the ads it serves. The tracking code is optionally JavaScript program code which, when executed by a web browser, transmits the contents of the ad over HTTP to a security server specified by its IP (Internet Protocol) address or domain name. The contents of the ad are typically HTML, CSS (Cascading Style Sheets), and/or JavaScript code. The adding of the tracking code to the ad optionally includes the wrapping of the ad's own code with certain start and end markers that will be used by the executing web browser to determine which code segment to transmit to the security server. Alternatively, the added tracking code includes instructions, such as regular expression (RegEX) instructions, that enable it to locate the ad's own code by alphanumeric patterns known to exist in it. As another alternative, the added tracking code is programmed to cause the executing web browser to transmit the entire HTML document containing the ad to the security server; because ads are often displayed inside an iframe, which is an HTML document nested inside another HTML document (the web page), transmitting the entire HTML document rendered inside the iframe will not transmit any redundant HTML and/or JavaScript code to the security server—just the ad's own code.

In a step 204, the web browsers receive the served ads and display them in dedicated advertising spaces. In the case of a web browser that is used to access a Web site, the web browser may display the ad as an HTML sub-document nested inside in iframe of an HTML document. Namely, the HTML document may be a Web page which includes an iframe (positioned and dimensioned according to how the Web page has been programmed), and the ad may be an HTML sub-document nested inside that iframe. In the case of a WebView in a mobile app, it may display the ad as an HTML document without the need for an iframe. The WebView itself is a dedicated advertising space, which is positioned and dimensioned according to how the mobile app has been programmed.

The act of displaying the ads also includes the execution of any program code, such as JavaScript program code, included with the ads. Accordingly, in step 204, the tracking code is executed by the web browsers.

The web browsers may run on various computing devices of end users, such as portable computing devices (e.g., smartphones, tablets, smartwatches running operating systems such as Android™, iOS®, BlackBerry® OS, Windows® Mobile, or Tizen™) and desktop/laptop computing devices (running operating systems such as Windows®, macOS®, or Linux). The executed tracking code transmits the contents of the ads over HTTP to the security server.

In a step 206, the ad server receives the ad contents, scans them for the presence of malicious code, and stores the results in a database. Also stored is an identifier of each of the ads, which will enable looking up that ad in the database later. The identifier may be one which is already included in the contents of the ad, such as one of the various identifiers listed in IAB Technology Lab, "OpenRTB Specification v3.0," (November 2018), available online at https://github-.com/InteractiveAdverti singBureau/openrtb/blob/master/ OpenRTB %20v3.0%20FINAL.md (last viewed Jul. 1, 2019): the item.id' attribute, which is an ID of an item object in a related bid request; and/or the 'cid' attribute, which is a campaign identifier or an identifier of other similar grouping of brand-related ads.

Alternatively, an identifier may be computed, in step 206, based on the contents of the ad. For example, a hash function may be applied to the contents of the ad or to one or more segments of the contents, to produce a hash code that uniquely identifies that ad.

A problem may arise when an attacker, who discovered that her ad is blocked by the ad server, attempts to slightly change the contents of the ad (e.g., its HTML and/or JavaScript) and resubmit it to the ad server. If the contents of the resubmitted ad cause the ad server to query the security server with an identifier different than the one previously assigned to the original ad, the security server may reply that the ad has not been scanned in the past, and the ad server may start serving it. To solve this problem, a text similarity algorithm, as known in the art, may be used. This is further discussed in connection with step 208, below.

The scanning may include searching for strings of text (and/or numbers, symbols) that are included in a 'blacklist' of strings that are known to be included in malicious advertisements. These strings may include, for example, URLs or parts of such URLs that have been determined in the past to be associated with attackers, such as URLs including domain names known to be associated with them.

Additionally or alternatively, the scanning may include searching for software methods capable of invoking a user event without an action by a user of a web browser, and then analyzing that user event to determine if it is configured to cause the web browser to perform an action outside the dedicated advertising space. This type of attack, referred to herein as a "redirection attack," is typically conducted through JavaScript programming inside the ad.

To search for such software methods, a web browser emulator may be used to execute the contents of the ad (e.g., its JavaScript programming) and to inspect the events and/or actions which occur in the web browser emulator as a result of the execution.

Such invoked user events may include the opening of a new URL (Uniform Resource Locator) the web browser; such new URLs are naturally opened by web browsers beyond the bounds of the dedicated advertising space. That URL may be of an HTML document, hosted on some remote Web server, that includes further advertisements or even links to download additional software applications onto the computing device running the web browser. Such additional software applications may infect the computing device with a computer virus, a trojan, etc. The HTTP link may be to a URL of a software application hosted inside an "app store", such as the App Store of Apple, Inc., the Google Play App Store of Google, Inc., or the Microsoft Store of Microsoft Corp.; as the URL is opened, the computing device may automatically launch a software application that implements the pertinent app store, such as the "App Store" software application on iOS devices, etc. Therefore, the user of the computing device will suddenly be presented with an offer to download an additional software application onto her computing device—all as the result of the malicious content that managed to break out of the designated advertising space.

The following code, which combines HTML and JavaScript, is an example of a redirection attack which may accompany a seemingly-innocent ad. Annotations are shown with a preceding double slash:

```
<html>
<body>
<script>
var target = 'https://www.ynet.co.il'; // This variable contains the URL to which the redirection will be made.
function redirect(e) {
    if (e = ='link') { // A first scenario, attempting to redirect by a simulated click on a link.
        var f = document.createElement('a'); // Creates a link that will later be subjected to a simulated user click.
        f.target = '_top'; // Instructs the browser that the link will be opened in the '_top' document.
        f.href = target;
        document.body.appendChild(f); // Adds object "f", which includes the link and its target, to the present document (displayed in an iframe).
        var g = document.createEvent('MouseEvent');
        g.initMouseEvent('click', !![ ], !![ ], window, 0x0, 0x0, 0x0, 0x0, 0x0, ![ ], ![ ], ![ ], ![ ], 0x0, null); // Prepare a simulated click event.
        f.dispatchEvent(g); // Will trigger the simulated click event.
    } else if (e = = 'form') { // A second scenario, to be activated in the first scenario fails. In this scenario, a form submission is simulated.
        var h = document.createElement('form'); // Creates a form that will later be subjected to a simulated from submission.
        h.target = "_top"; // Instructs the browser that the form will submit to the '_top' document.
        h.action = target;
        h.method = 'GET';
        document.body.appendChild(h); // Adds object "h", which includes the form and its target, to the present document (displayed in the iframe).
        h.submit( ); // Will trigger the simulated form submission.
    }
};
setTimeout(function ( ) {
    redirect('link'); // Run the redirect function using the link method.
},1);
setTimeout(function ( ) {
    redirect ('form'); // Run the redirect function using the form method.
},2000); // The function will be run after a 2-second delay.
</script>
</body>
</html>
```

The listening is to synthetic events, masqueraded as events performed by the real user of the computing device ("user events"), because this type of events is capable of instructing the web browser to perform actions beyond the limited environment of the designated advertising space.

The listening may be performed by way of hooking to software methods (i.e. Document Object Model "DOM" methods) that have the aforementioned capability to synthesize user events. The hooking essentially intercepts events that are triggered by these software methods, such that we are able to inspect them before they reach execution.

The hooking may be, for example, to one or more of the following DOM methods: "HTMLElement.prototype.click", "EventTarget.prototype.dispatchEvent", "HTMLFormElement.prototype.submit", "Event( )" constructor, "fireEvent( )", "document.createEvent", "Event.initEvent( )", "MouseEvent", and "UIEvent".

Once one of these hooks intercepts and detects an event, the following analysis takes place: Is the intercepted event is a user event configured to cause the WebView to navigate away from it? User events suspicious of that may be events such as "document.createEvent", "Event.initEvent", use of an "Event( )" constructor to create a new event, and/or a registration of a new event listener (such as "EventTarget.addEventListener", "attachEvent( )", or "captureEvents( )").

The exact technique to analyze the intercepted user event and determine if it is configured to navigate away from the designated advertising space may differ, based on the nature of the DOM method. The following exemplary JavaScript codes show both the hooks and the analyses done to determine if the intercepted user events can navigate away from the designated advertising space:

In the case of the DOM method being "HTMLElement.prototype.click" the following exemplary Javascript code may be used:

```
1:      _click = HTMLAElement.protoype.click;
2:      HTMLElement.prototype.click = function ( ) {
3:          if (this.target = = = '_top') {
4:              reportRedirect({
5:                  target: this.href;
6:              });
7:          } else {
8:              return _click.call(this);
9:          }
10:     }
```

In line 1 of the code, the original HTMLAElementprotoype.click function that was called by the potentially malicious code (namely, the advertising code) is saved to a variable called "_click", for later use.

In line 2, the HTMLAElementprotoype.click is hooked to. When the potentially malicious code attempts to invoke that DOM event, the function in lines 3-10 will first execute, while the original invocation is placed on hold.

In line 3, the code checks if the target the HTMLAElementprotoype.click is the '_top' document. If it is, then line 4 may report that redirection attempt to a remote server. The report may include, for example, the URL which the potentially malicious code attempted to navigate to, as line 5 shows. The server may then determine whether the navigation should be prevented or allowed to proceed. For example, the server may compare the target URL of the redirection attempt against a blacklist and/or a whitelist of URLs. As another example, the server may instruct to block any and all redirection attempts, regardless of the target URL. If the server decides not to prevent the redirection, then line 8 may execute, fetching the contents of the original HTMLAElementprotoype.click from the saved "_click" variable, and allowing it to execute. Then, we return to the listening stage and continue monitoring future events. If the server decides to prevent the redirection, then line 8 may be skipped, which will not release the previous-set hook and effectively prevent the navigation (note that the above exemplary code does not show, for reasons of brevity, the exact mechanism of communicating with the remote server, receiving its instructions and executing them).

In the case of the DOM method being "EventTarget.prototype.dispatchEvent" the following exemplary Javascript code may be used:

```
1:      _dispatchEvent = EventTarget.prototype.dispatchEvent;
2:      EventTarget.prototype.dispatchEvent = function (event) {
3:          var isClick = event.type = = = 'click';
4:          var isTopNav = event.target.target = = = '_top';
5:          var url = event.target.href \\ event.target.action;
6:          if (isClick && isTopNav) {
7:              reportRedirect({
8:                  target: url
9:              });
10:         } else {
11:             _dispatchEvent.apply(this, arguments);
12:         }
13:     };
```

In line 1 of the code, the original EventTargetprototype.dispatchEvent function that was called by the potentially malicious code is saved to a variable called "_dispatchEvent", for later use.

In line 2, the EventTargetprototype.dispatchEvent is hooked and listened to. When the potentially malicious code attempts to invoke that DOM event, the function in lines 3-13 will first execute, while the original invocation is placed on hold.

The analysis is performed in lines 3-6:

In line 3, the code checks if the event type of EventTarget.prototype.dispatchEvent is a click event, and stores "true" or "false" in a "isClick" variable.

In line 4, the code stores the redirection URL to a "url" variable, whether it originates in an "a" HTML tag or a "form" HTML tag.

In line 5, the code checks if the event is both a click and targets the '_top' document.

In lines 7 and 8, like in the previous code sample, the redirect attempt may be reported to a remote server. Line 11 allows the original EventTargetprototype.dispatchEvent to execute, if a decision to allow this to happen has been reached.

In the case of the DOM method being "HTMLFormElement.prototype.submit" the following exemplary Javascript code may be used:

```
1:      submit = HTMLFormElement.protoype.submit;
2:      HTMLFormElement.prototype.submit = function ( ) {
3:          if (this.target = = = '_top') {
4:              reportRedirect({
5:                  target: this.action;
6:              });
7:          } else {
8:              return _submit.call(this);
9:          }
10:     }
```

In line 1, reference to the original submit function is saved.

The function of line 2 will be called when a potentially-malicious script calls "a.click( )".

Line 3 checks whether the target of the form submission is the "_top" document.

Line 4 reports the redirection attempt to a remote server, if the check of line 3 was positive.

Line 5 includes, in the report, the target URL of the redirection attack.

Line 8 executed if the target was not the '_top' document, allows the form to submit normally and without any intervention.

Note that the preventing of the navigation need not necessarily be decided by the server. It is optional to simply allow the Javascript code to prevent navigation immediately upon detecting that the event can navigate the main document. The report to the server may be carried out, for example, if it is desired to let the server run a more thorough check first, or to simply log the occurrence.

In the above examples, the URL to which the malicious code attempts to redirect may sometimes be obfuscated to avoid detection. For example, the author of the malicious code may encode the target URL in such a way to fail any attempt to match it against a blacklist of URLs. For instance, the URL google.com may be encoded as "//%77%77%77%2E%67%6F%6F%67%6C%65%2-E%63%6F%6D". While this means nothing to an unsuspecting observer, the WebView, when decoding the string, will navigate to google.com. Accordingly, we can optionally use the WebView's own parser to first decode the target for the redirection, before transmitting it to the remote server and/or comparing it against a black list or a white list.

In a step 208, results of the scanning may be stored in a computerized database. The database may be maintained at the at the ad server, at the security server, or at a different server that is accessible by the ad and security servers. The term "maintained at" means that the database is either stored in a non-transitory memory of the server itself or hosted on a different computer in the same local network as server, to enable fast communications between the two. There is an advantage for maintaining the database at the advertising server because that server needs to receive fast responses to queries it makes in real-time, before serving each ad. The security server, on the other hand, has a lesser demand for fast response time of the database, because the frequency at which it updates the database with scan results is significantly less than the frequency of ad serving by the ad server. Optionally, the database and the ad server are configured such that the delay between a query by the ad server and a response received at the ad server is less than 500 milliseconds (ms), less than 400 ms, less than 300 ms, less than 200 ms, less than 100 ms, less than 50 ms, less than 40 ms, less than 30 ms, less than 20 ms, or less than 10 ms.

The stored results of the scanning may indicate one of the following: the ad includes malicious code, or the ad is devoid of malicious code.

Is a step 208, at the ad server, every time a new ad ("new" in the sense of having won that particular RTB, not in the sense of not having been served in the past by the ad server) has won an RTB process, and right before serving that ad, a query may be made to the database to obtain security information for that ad. The query may include an identifier of the ad, and a request for a status for that identifier, the status being representative of one of the following: (a) the ad has been scanned in the past, and includes malicious code, (b) the ad has been scanned in the past, and is devoid of malicious code, or (c) the ad has not been scanned in the past. The latter may also be manifested as an empty or invalid response from the database, which means the database could not find the ad identifier at all.

To solve the aforementioned problem of an attacker causing an ad identifier to change in order to avoid detection, the following measures may be employed: in addition to querying the database with an identifier of the ad, or instead of performing such query, the ad server may apply a text similarity algorithm, as known in the art, to check if the contents of the ad are similar to contents of another ad stored in the database with the status "malicious." If they are, then the method may proceed to step 214 below—blocking the ad. The degree of similarity that triggers such blocking may be, for example, over 70% similarity, over 80% similarity, or over 90% similarity, to list a few examples.

Another solution to that problem is to compute, in step 206, an identifier that is a compressed representation of some or all of the ad's contents. Such identifiers are stored for each of the ads in the database. Then, in step 208, the ad server may relatively quickly compute (based on the same algorithm as in step 206) a compressed representation of the new ad and query the database with that compressed representation. The database, or a computing device associated with the database, may then apply a similarity algorithm to check if the compressed representation of the query is similar to any of the compressed representations stored in the database. The advantage of this technique is that the computation of the compressed representation of the new ad, and the subsequent application of the similarity algorithm can be performed rather quickly, without considerably delaying the serving of the new ad. An example of a compressed representation may be text embedding, as known in the art. The process of embedding produces a vector of numerical values that represent the contents of the pertinent ad. Then, similarity between vectors may be calculated using known techniques such as cosine similarity, Manhattan distance, Euclidean distance, etc.

Yet a further solution to the aforementioned problem is to train a machine learning classifier on a training set that includes a large number of ads (HTML and/or JavaScript) with a manual annotation that indicates which ads were considered by a human reviewer to be similar to each other. The trained classifier may then be able to classify a pair of ads as similar or not (or to provide a score of their estimated degree of similarity, and/or a confidence score of the classification). This classifier may be applied, in step 206, to the new ad and to the ads stored in the database, to check if the new ad is similar to any of the ads in the database that have a status of "malicious."

In a step 210, the database responds with one of the above statuses, which can be referred to as "malicious,", "safe," and "unknown," respectively.

If the database response is that the ad is malicious, then the ad server may block 214 the ad, namely—refrain from serving it. To ensure that a request for an ad by a Web site or a mobile app is not left unanswered, the ad server may proceed to check the second-highest bidder in the RTB by querying the database with its ad identifier. If also the second-highest bidder turns out to be malicious, the subsequently-highest bids may be checked in the same manner.

If the response from the database indicates that the ad (or the subsequently-highest bidder ad) is safe, the ad server may proceed to serve 212 that ad.

Lastly, if the response from the database indicates that the ad is unknown, then the ad server may add the tracking code to the ad and serve it, effectively returning to step 202. This way, the contents of the ad will be transmitted by one of the users to the security server (step 204), be scanned (step 206), and the results be added to database for future use (step 208).

Optionally, even for ads that are served 212 after being determined to be safe, the ad server may periodically add the tracking code to facilitate the re-scanning of these ads. This may ensure that the ad has not been modified by its author in a way which keeps that ad's identifier but includes malicious code in its contents. The term "occasionally" may refer to a frequency of, for example, once every 100-500, 500-1000, 1000-2000, 2000-3000, 3000-4000, 4000-5000, or more than 5000 servings of the ad.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Steps described as being "automatic" are performed without human intervention, namely, by a computer that is pre-programmed to perform the pertinent step without a human user having to manually instruct the computer to perform the step.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The description of program code, program instructions, computer instructions, software methods, or the like, which are said to be 'configured' to execute certain actions, may refer to these elements being programmed to execute those actions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method comprising, at an advertising server that employs RTB (Real-Time Bidding):
   (i) prior to serving a new advertisement that has won an RTB process, querying a database for scan results associated with the new advertisement, to determine if the new advertisement: (a) has been scanned in the past, and includes malicious code, (b) has been scanned in the past, and is devoid of malicious code, or (c) has not been scanned in the past;
   (ii) when the new advertisement has been determined to include malicious code, preventing a serving of the new advertisement;
   (iii) when the new advertisement has been determined to be devoid of malicious code, allowing a serving the new advertisement; and
   (iv) when the new advertisement has been determined to not having been scanned in the past, adding tracking code to the new advertisement and serving the new advertisement with the added tracking code, such that contents of the new advertisement are scanned.

2. The method according to claim 1, further comprising, prior to (i):
   at the advertising server:
      adding the tracking code to advertisements served by the advertising server, wherein the tracking code is configured to cause web browsers displaying the served advertisements to transmit contents of the advertisements to a security server; and
   at the security server:
      receiving the contents of the advertisements from web browsers that displayed the served advertisements,
      scanning the contents of the advertisements to detect presence of malicious code, and
      storing results of the scanning, as said scan results, in the database,
   wherein the database is maintained at the advertising server, at the security server, or at a different server.

3. The method according to claim 2, wherein the tracking code comprises JavaScript program code.

4. The method according to claim 2, wherein the scanning of the contents of the advertisements comprises:
   searching for software methods capable of invoking a user event without an action by a user of a web browser; and
   analyzing the user event to determine if the user event is configured to cause the web browser to perform an action outside a dedicated advertising space.

5. The method according to claim 4, wherein the user event is determined to be configured to cause the web browser to perform the action outside the dedicated advertising space, if the user event is of the group consisting of:
   "document.createEvent";
   "Event.initEvent"; and
   use of an "Event( )" constructor to create a new event.

6. The method according to claim 4, wherein the user event is determined to be configured to cause the web browser to perform the action outside the dedicated advertising space, if:
   the user event comprises a registration of a new event listener.

7. The method according to claim 6, wherein said new event listener is selected from the group consisting of:
   "EventTarget.addEventListener";
   "attachEvent( )"; and
   "captureEvents( )".

8. The method according to claim 4, wherein:
   the dedicated advertising space is an HTML (HyperText Markup Language) sub-document nested inside an iframe of an HTML document; and
   the action outside the dedicated advertising space is navigation away from the HTML document.

9. The method according to claim 4, wherein the dedicated advertising space is inside a software application which is not a web browser.

10. A system comprising:
    an advertising server configured to employ RTB (Real-Time Bidding), the advertising server comprising at least one hardware processor and a non-transitory computer-readable storage medium having program code embodied therewith, the program code being executable by said at least one hardware processor to:
    (i) prior to serving a new advertisement that has won an RTB process, query a database for scan results associated with the new advertisement, to determine if the new advertisement: (a) has been scanned in the past, and includes malicious code, (b) has been scanned in the past, and is devoid of malicious code, or (c) has not been scanned in the past,
    (ii) when the new advertisement has been determined to include malicious code, preventing a serving of the new advertisement,
    (iii) when the new advertisement has been determined to be devoid of malicious code, allowing a serving the new advertisement, and
    (iv) when the new advertisement has been determined to not having been scanned in the past, adding tracking code to the new advertisement and serving the new advertisement with the added tracking code, such that contents of the new advertisement are scanned.

11. The system according to claim 10, wherein:
    the system further comprises a security server;
    the advertising server is further configured, prior to (i), to:
       add the tracking code to advertisements served by the advertising server, wherein the tracking code is configured to cause web browsers displaying the served advertisements to transmit contents of the advertisements to said security server; and
    said security server is configured to:
       receive the contents of the advertisements from web browsers that displayed the served advertisements, scan the contents of the advertisements to detect presence of malicious code, and
store results of the scanning, as said scan results, in the database,
wherein the database is maintained at the advertising server, at the security server, or at a different server.

12. The system according to claim 11, wherein the tracking code comprises JavaScript program code.

13. The system according to claim 11, wherein the scanning of the contents of the advertisements comprises:
searching for software methods capable of invoking a user event without an action by a user of a web browser; and
analyzing the user event to determine if the user event is configured to cause the web browser to perform an action outside a dedicated advertising space.

14. The system according to claim 13, wherein the user event is determined to be configured to cause the web browser to perform the action outside the dedicated advertising space, if the user event is of the group consisting of:
"document.createEvent";
"Event.initEvent"; and
use of an "Event( )" constructor to create a new event.

15. The system according to claim 13, wherein the user event is determined to be configured to cause the web browser to perform the action outside the dedicated advertising space, if:
the user event comprises a registration of a new event listener.

16. The system according to claim 15, wherein said new event listener is selected from the group consisting of:
"EventTarget.addEventListener";
"attachEvent( )"; and
"captureEvents( )".

17. The system according to claim 13, wherein:
the dedicated advertising space is an HTML (HyperText Markup Language) sub-document nested inside an iframe of an HTML document; and
the action outside the dedicated advertising space is navigation away from the HTML document.

18. The system according to claim 13, wherein the dedicated advertising space is inside a software application which is not a web browser.

19. A computer program product comprising at least one non-transitory computer-readable storage medium having program code embodied therewith, the program code executable by at least one hardware processor to:
at an advertising server that employs RTB (Real-Time Bidding):
(i) prior to serving a new advertisement that has won an RTB process, querying a database for scan results associated with the new advertisement, to determine if the new advertisement: (a) has been scanned in the past, and includes malicious code, (b) has been scanned in the past, and is devoid of malicious code, or (c) has not been scanned in the past;
(ii) when the new advertisement has been determined to include malicious code, preventing a serving of the new advertisement;
(iii) when the new advertisement has been determined to be devoid of malicious code, allowing a serving the new advertisement; and
(iv) when the new advertisement has been determined to not having been scanned in the past, adding tracking code to the new advertisement and serving the new advertisement with the added tracking code, such that contents of the new advertisement are scanned.

20. The computer program product according to claim 19, wherein the program code is further executable, prior to (i), to:
at the advertising server:
add the tracking code to advertisements served by the advertising server, wherein the tracking code is configured to cause web browsers displaying the served advertisements to transmit contents of the advertisements to a security server; and
at the security server:
receive the contents of the advertisements from web browsers that displayed the served advertisements,
scan the contents of the advertisements to detect presence of malicious code, and
store results of the scanning, as said scan results, in the database,
wherein the database is maintained at the advertising server, at the security server, or at a different server.

* * * * *